United States Patent [19]

Gibble

[11] 3,758,532

[45] Sept. 11, 1973

[54] PROCESS FOR IMPROVING THE COOKING STABILITY OF SOYBEAN OIL
[75] Inventor: Walter P. Gibble, La Habra, Calif.
[73] Assignee: Hunt-Wesson Foods, Inc., Fullerton, Calif.
[22] Filed: Sept. 11, 1970
[21] Appl. No.: 71,328

[52] U.S. Cl. .............................. 260/420, 99/118 R
[51] Int. Cl. ............................................. C09f 5/10
[58] Field of Search .................... 260/420, 428, 419

[56] References Cited
UNITED STATES PATENTS

| | | | |
|---|---|---|---|
| 3,271,410 | 9/1966 | Cagneron et al. | 260/419 X |
| 2,292,027 | 8/1942 | Glenn | 260/428 X |
| 2,275,660 | 3/1942 | Steinle et al. | 260/428 X |
| 2,508,919 | 5/1950 | Jakobsen | 260/420 |
| 2,674,609 | 4/1954 | Beal et al. | 260/428 |

Primary Examiner—Lewis Gotts
Assistant Examiner—Ethel G. Love
Attorney—Gerald L. Price

[57] ABSTRACT

Unhydrogenated or partially hydrogenated refined soybean oil is degassed under vacuum to remove a substantial proportion of the air dissolved in the oil; the degassed oil is gassed with carbon dioxide and heated to a temperature above 100° C. in the presence of a copper chromite catalyst, optionally in the presence of activated charcoal. After the heat treatment the oil is cooled, filtered, bleached, and deodorized to yield the finished treated oil. The finished treated oil exhibits a frying and odor stability far surpassing soybean oil treated in any other manner.

19 Claims, No Drawings 3,758,532

PROCESS FOR IMPROVING THE COOKING STABILITY OF SOYBEAN OIL

BACKGROUND OF THE INVENTION

The present invention is directed toward a method of processing vegetable oils. In particular the present invention is directed toward a method of improving the odor stability of unhydrogenated or partially hydrogenated refined soybean oil for storage and frying purposes.

Soybean oil represents a readily available and relatively inexpensive source of nutritional vegetable oil. However, untreated soybean oil has the characteristic of readily evolving objectional odors at frying temperatures, that is, temperatures within the range of about 350° F. to about 400° F. or higher, which has been variously described as a beany, grassy, and/or fishy smell. This odor is quite pungent, markedly unpleasant, and very unappetizing. In the case of finished untreated soybean oil (refined, bleached, and deodorized soybean oil), this objectionable odor can occur in a matter of seconds upon heating and reaching frying temperature.

Many attempts have been made in the art to eliminate the objectionable frying odors of soybean oil. One solution, which is commercially employed, is to partially hydrogenate the soybean oil. See "Advances in Research on the Flavor Stability of Edible Soybean Oil" by J. C. Cowan, published in Food Technology, Vol. 19, No. 9, pages 107-146 (1413-1452),1965. Partial hydrogenation has been quite successful in increasing flavor stability of soybean oil for room temperature use or storage. However, the hydrogenation process must be carefully controlled to prevent the resulting hydrogenated soybean oil from obtaining a lard-like consistency. Further, hydrogenation increases the saturation of the fatty acids in soybean oil; most experts in the field believe this causes a decrease in the nutritional value of soybean oil. Furthermore, increased saturation of the oil is believed by many physicians to be undesirable in today's diets. Hydrogenation also increases the price of the finished soybean oil because it produces stearin which must be removed by a conventional winterization process prior to marketing; this decreases the overall yield of the finished marketable soybean oil.

A second method which is commercially used today for increasing the stability of soybean oil is deodorization (see the above cited J. C. Cowan article). Deodorization, which is a vacuum steam distillation of the oil, optionally in the presence of citric acid, improves the storage flavor stability of soybean oil; however, this stability is only for a short period of time and has little, if any, effect in increasing the odor stability of soybean oil at frying temperatures.

Another method of increasing the flavor stability of soybean oil is disclosed and claimed in Harvey D. Royce's U.S. Pat. No. 2,349,381, issued May 23, 1944. The method disclosed in this patent comprises heating the soybean oil at a temperature between 240° and 300° C. out of contact with air and the presence of finely divided particles of zinc, magnesium,or tin for a period of between 10 and 120 minutes. This method, which has not been commercially successful, increases the flavor stability of soybean oil for room temperature use, such as for salad oil. This method also has little effect in eliminating the undesirable odors developed by soybean oil at frying temperatures.

SUMMARY OF THE INVENTION

The present invention is directed toward a method of improving the frying stability of unhydrogenated or partially hydrogenated refined soybean oil and comprises the steps of degassing the soybean oil under vacuum to remove a substantial portion of the atmospheric gases (air) contained in the oil; gassing the degassed soybean oil with carbon dioxide gas; and heating the soybean oil with a copper chromite containing catalyst, optionally in the presence of activated charcoal, in a carbon dioxide gas atmosphere for a predetermined length of time. After the heating step, the treated soybean oil is cooled, filtered, bleached with bleaching earth and deodorized to yield the finished treated oil.

An object of the present invention is to provide a method of treating refined soybean oil to eliminate objectionable odors at frying temperature. More particularly, it is an object of the present invention to provide a method of treating soybean oil to improve its odor stability under frying conditions without increasing the saturation content of the soybean oil, without decreasing the nutritional value of the soybean oil, and without increasing the stearin content of the soybean oil. A further object of the present invention is to provide a soybean oil that has improved flavor and odor stability for cooking purposes, vegetable oil purposes and for prolonged storage.

DETAILED DESCRIPTION OF THE INVENTION

The present method comprises the steps of degassing refined unhydrogenated or partially hydrogenated refined soybean oil to remove a substantial portion of the atmospheric gases from the oil; gassing the degassed soybean oil with carbon dioxide; and heating the soybean oil with a copper chromite containing catalyst, optionally in the presence of activated charcoal, in a carbon dioxide gas atmosphere for a predetermined length of time.

The soybean oil is degassed under a vacuum of less than 10 millimeters of mercury and preferably with agitation. The degassing can be performed at either room temperature or elevated temperatures. In the preferred embodiment of the present invention, the degassing is conducted at a temperature of between 20° and 60° C. The degassing is generally completed within an hour with sufficient agitation.

After the degassing step, carbon dioxide gas is bubbled or blown through the oil and preferably vented into the head space above the oil. The gassing with carbon dioxide gas continues until a slight positive pressure is obtained. In the preferred embodiment of the process, the oil is saturated with carbon dioxide gas.

After the gassing of the oil with carbon dioxide has been completed, a copper chromite containing catalyst is added to the gassed oil. The catalyst is added to the oil in amounts of about 0.005 to about 10 percent catalyst by weight of oil, preferably from about 0.01 to about 0.2 percent. The catalyst is preferably in the powdered form, although foraminous, particulated or shaped catalyst can also be employed. A copper chromite containing catalyst is a catalyst that contains substantial portions of copper and chromium salts, such as oxides. The catalyst contains by weight from about 7% to about 65% nonelemental copper and from about 4% to about 41% nonelemental chromium. The catalyst can also contain about 4% to about 14% by weight nonelemental barium, or from about 2% to about 6% by weight of zirconium or from about 0.1% to about 1% palladium. The term "nonelemental copper" means that the copper is not in the free state, but rather is combined with other elements or molecular species such as oxygen or chromate. Likewise, the terms "nonelemental chromium" and "nonelemental barium" mean that the chromium or barium are not in the free state, but rather are combined with other elements or molecular species, such as oxygen or chromate (in the case of barium). The catalyst can be unsupported, or it can be supported upon an inert support such as barium sulfate, neutral alumina, a refractory material, or charcoal. A catalyst containing at least 24% by weight nonelemental copper, at least 20% by weight nonelemental chromium and about 9% by weight nonelemental barium performs very well in the present process. An especially preferred catalyst for the present process is the powdered Girdler G–22 barium promoted copper chromite catalyst sold by the Girdler Catalyst Division of Chemetron Corporation, Louisville, Ky. This particular catalyst contains from about 31.5% to about 35.5% nonelemental copper, about 25.5% to about 29.5% nonelemental chromium, and from about 9.5% to about 13.5% nonelemental barium. The surface area of this powdered catalyst is 26.4 m$^2$/g. Carbon tetrachloride pore volume is 1.03 cc/g. at 800 angstroms and 0.01 cc/g. at 140 angstroms. Mercury pore volume is 1.60 cc/g. at pore diameter range of 45-1 microns, and 0.80 cc/g. at pore diameter range 1.0–0.035 microns. Differential thermal analysis of the catalyst shown (1) static air to 500°C. — very small exotherm at 372°C. and (2) hydrogen at 5,000 space velocity — large exotherm at 158°C., take-off temperature 125°C. (CuO - Cu). X-ray diffraction of the catalyst shows the following:

| Crystalline Compounds | Mean Crystallite Size, Angstroms |
|---|---|
| CuO | 233 |
| BaCrO$_4$ | 1282 |
| CuCr$_2$O$_4$ | 86 |
| Cr$_2$O$_3$ (cubic) | — |

The copper chromite catalysts are apparently made up of crystalline complexes of copper oxide, copper chromate, and chromite. When the catalyst also contains barium or zirconium, the barium is usually complexed to form barium oxide and barium chromate; alternatively, the zirconium is complexed to zirconium oxide and zirconium chromate. The powdered copper chromite catalysts have an apparent bulk density-pack of between 20 lbs./cu. ft. and 80 lbs./cu. ft. with surface areas of between 5 square meters per gram to about 60 square meters per gram. Copper chromite catalysts are commercially available from many sources, such as the Chemetron Corporation or the Harshaw Chemical Company in Cleveland, Ohio.

Optionally, finely divided or particulated activated charcoal, such as the Nuchar brand activated charcoal, is added together with the catalyst to the gassed oil. The charcoal is added in the ratio of about 0.01% to about 0.2% activated charcoal by weight to gassed oil. Conveniently equal amounts of the copper chromite containing catalyst and activated charcoal are added to the oil.

After the catalyst or catalyst and activated charcoal have been added to the oil, the oil is heated as rapidly as possible to a temperature between 100°C. and about 300°C., usually between a temperature of about 190°C. and about 275°C. The preferred reaction temperature is about 250°C. Once the reaction temperature has been reached, the oil is maintained at that temperature for at least one-half hour, preferably for at least 1 hour. During the heating period and reaction period, the oil is agitated by conventional means, such as mechanical stirrers, and the oil is blanketed with a carbon dioxide gas atmosphere; preferably a small amount of carbon dioxide is also bubbled through the oil catalyst reaction mixture.

After the reaction period or catalyst treatment is complete, the reaction mixture is cooled to a temperature below 80°C. and pumped through an industrial filter to remove the solids therefrom, that is, the catalyst or catalyst and activated charcoal particles. The oil is then degassed under vacuum to remove a substantial portion of the carbon dioxide gas in the oil. After the degassing is accomplished, the oil is gassed with nitrogen gas and bleached by a conventional bleaching process using bleaching earth using vacuum conditions or under a nitrogen gas atmosphere. After the bleaching step, the oil is deodorized by a conventional oil deodorizing process employing steam. After the deodorization step, the oil can be placed in storage or containerized, preferably under an inert gas atmosphere, by conventional means known to the art.

One of the important aspects of the present process is to minimize the contact time between carbon dioxide gas and the oil. It is well known in the art that when oil is stored under an oxygen atmosphere either in the absence or presence of light, the oil rapidly develops an off flavor; see "Refined Soybean Oils Boast Quality, Stability", Food Engineering, July, 1965, pages 57–59. However, rather surprisingly, I have discovered that soybean oil stored for a prolonged period under a carbon dioxide gas atmosphere also develops an off flavor. Accordingly, one of the essential requirements of the present invention is to provide that the following sequence of steps of: gassing the oil with carbon dioxide gas, catalytically treating the gassed oil, filtering the treated oil, and subsequently degassing the filtered oil are performed in rapid succession to minimize the total time in which the oil is in contact with the carbon dioxide gas atmosphere.

Although the present process has been described as comprising the following sequence of steps: degassing, gassing with CO$_2$, and heating the oil with the catalyst, this sequence can be varied without departing from the inventive process. For example, the degassed oil can be heated, mixed with the catalyst and then gassed with CO$_2$; or it can be heated, gassed and then catalytically treated; or it can be mixed with catalyst, gassed and then heated, or it can be mixed with catalyst, heated and then gassed; or it can be gassed, heated and then catalytically treated, or the like.

The following examples are included to further illustrate the present invention but are not intended to serve as limitations of the present invention.

EXAMPLE 1

Step 1. Degassing and Gassing Treatment

A stainless steel reaction vessel was charged with approximately 14,500 lbs. of refined soybean oil. The reaction vessel was equipped with a 3-stage steam-jet vacuum system which provided 1.3–1.5 mm Hg pressure without stripping steam, an internal coil was provided for steam heating/watercooling and a second internal coil connected to a Dowtherm boiler for reactor heating at temperatures in excess of those obtainable with stream. In addition, the reaction vessel was provided with a double impeller agitator, a bottom steam stripping coil and a single overhead water coil for washing-down purposes. The oil was degassed for one hour with agitation, during which time the batch was heated from 105° to 135°F. At the end of this period the agitator was turned off momentarily and with the manometer reading 6 mm Hg, no off-gassing could be observed. Carbon dioxide gas was introduced into the reactor through the sparging coil and immediately thereafter carbon dioxide gas was vented into the head space of the reactor. The vacuum steam jets were closed slowly and carbon dioxide gas was continuously supplied both above and below the oil until the reactor was at atmospheric pressure. A slight positive gas pressure was evidenced upon venting at an overhead valve.

Step 2. Catalyst Treatment

The overhead supply of carbon dioxide gas was turned off and the supply of gas through the sparging ring was reduced sufficiently to permit catalyst and carbon addition through a 2 inch gate valve at the top of the reactor. With the agitator turned on, thirteen pounds (0.09%) of Girdler G–22 catalyst (barium promoted copper chrome powder) and 13 lbs. of Nuchar activated carbon were added. The catalyst and activated charcoal were added as a slurry made of 13 lbs. of the catalyst, 13 lbs. of activated charcoal and 60 lbs. of $CO_2$ gassed refined soybean oil which has been withdrawn from the reactor. The slurry was made under a carbon dioxide gas atmosphere to prevent air contamination. The catalyst-oil mixture was heated in the reaction vessel to 247° C. During the 65-minute reaction period, the temperature of the mixture was maintained at 250° C. At atmosphere of carbon dioxide gas was maintained in the head space of the reactor by the overhead gas vent as well as a low flow rate of gas which was caused to bubble through the oil from the sparging coil. The mixture was cooled to 51.5° C. and the catalyst-oil mixture pumped through an industrial filter and returned to the reaction vessel. Following a 1-½-hour recycle period, the oil was transferred to a clean storage tank filled with nitrogen gas, and was filtered first by the industrial filter (horizontal leaf, Model 2–56, Type 116.914 size 36–1–14) and lastly by a Ful-flow unit. The treated and filtered oil was degassed under vacuum and saturated with nitrogen gas.

Step 3. Bleaching

The catalyst treated, filtered oil was thereafter transferred by differential pressure displacement to the reaction vessel. The oil was heated with agitation to 250° F. (121° C.) and 7 mm Hg. pressure for approximately 10 minutes to insure dryness, after which the oil was cooled to 150° F. (65.5° C.). During heating and throughout the bleaching process, an atmosphere of nitrogen gas was maintained in the head space of the reactor. The oil was bleached at 150° F. using 200 lbs. of BC 200 bleaching earth (approximately 1.4%). Bleaching was carried out with agitation, under a nitrogen atmosphere for 35 minutes at 250° F., after which the oil was cooled to 125° F. (51.5° C.). The filtered oil was recycled for 2.3 hours, thereby providing a 2.5 volumetric displacement. During the recycle period a positive nitrogen gas pressure was maintained in the head space of the reaction vessel. The bleached oil was then transferred into a storage tank filled with nitrogen gas and filtered as described above.

Step 4. Deodorization

The reactor was cleaned (caustic boil-out followed by water boil-out) and the bleached filtered oil was transferred from the storage tank to the clean reaction vessel by differential pressure displacement. After charging the reaction vessel with oil and in the absence of steam sparging load, the absolute pressure was found to be 1.3 mm (Stokes McLeod Gage Model No. 276AA – 0 – 5,000 microns). The oil was then heated to 154° C. Deodorization was conducted at 232° C. and 4.8 mm absolute pressure, using an indicated 50 lbs. steam per hour for a period of 2 hours. Following the 2-hour deodorization period, the temperature was reduced to 146° C. at which time 33 ppm citric acid (aqueous solution) were added. The rate of temperature decrease was slowed over a 20-minute period (146° to 132° C.) to allow additional time for complete metal chelation. Thereafter rapid cooling was resumed and upon reaching 100° F. The finished treated oil was then packaged in nitrogen filled clear flint bottles and capped with nitrogen headspace gas.

EXAMPLE 2

Step 1. Degassing and Gassing Treatment

In a 3-L. round-bottomed flask, fitted with a mechanical stirrer, thermometer, and gas delivery tube, 2,000 grams of refined soybean oil are vigorously stirred for 45 minutes at reduced pressure (maximum - 1.0 mm Hg.). During this period of degassing, the temperature of the oil is slowly increased to 135° C. At reduced agitation, carbon dioxide gas is introduced into the flask until pressure slightly in excess of atmospheric is obtained.

Step 2. Catalyst Treatment

Stirring is halted and with a small, but continuous, flow of carbon dioxide gas into the flask, 0.075% G–22 catalyst and 0.075% activated carbon are introduced into the flask. Stirring is increased to a moderate rate and a sufficient flow of carbon dioxide is maintained to prevent the incursion of air into the flask. The temperature of the oil is increased to 250° C. and maintained for 1 hour. The temperature of the oil is then reduced to 70° C. for approximately 0.1% Dicalite is added. After mixing for several minutes, the mixture is filtered in a cloth-covered Buchner funnel under an atmosphere of nitrogen. The oil is recycled through the filter bed until clear. Thereafter the treated oil is degassed under vacuum and saturated with nitrogen gas prior to the bleaching operation.

Step 3. Bleaching

The treated soybean oil is bleached in an atmosphere of nitrogen gas using 2.5% BC–200 bleaching clay at 115° C. for a period of 20 minutes. The temperature of the oil is reduced to approximately 70° C. and filtered using a Dicalite (diatomaceous earth filter aid) coated filter cloth. The oil is recycled through the filter until clear and brilliant.

Step 4. Deodorization

The treated and bleached soybean oil is deodorized for 1 hour by steam stripping at 230° C. at 2.5 mm Hg pressure. During the cooling cycle, at approximately 155° C., 33 ppm citric acid are added, and the oil maintained at this temperature with continued steam stripping for 10 minutes. Cooling is resumed and at 130° C. the steam supply is closed and nitrogen gas is slowly admitted. The oil is packaged at approximately 45° C. by transfer into nitrogen gas-filled bottles. Samples of the refined soybean oil (the feed stock), the catalyst treated oil, and the finished treated oil (the oil that has been catalyst treated, bleached and deodorized) were analyzed and results are shown in the following table:

|  | Refined Soybean Oil | Catalyst Treated Oil | Finished Treated Oil |
|---|---|---|---|
| Lovibond color (Y/R) | 70Y/8.4R | 5Y/0.5R | 2Y/0.2R |
| Apparent chlorophyll $\mu$g/Kg | 679 | 293 | 47 |
| I.V. $\mu$g/Kg | 133.7 | 133.4 | 132.9 |
| Free Fatty Acid | 0.64 | 0.52 | 0.02 |
| Diene (%) | 0.21 | 0.45 | 0.49 |
| Dimer (%) | None detected | 0.18 | 0.27 |
| Total sterols (%) | 0.203 | 0.215 | 0.197 |
| Total Tocopherol | 0.049 | 0.059 | 0.93 |
| Copper (Cu) ppm | 0.11 | 0.06 | 0.03 |
| Iron (Fe) ppm | 0.21 | 0.03 | 0.03 |
| Total phosphorus ppm | 0.2 | 1.0 | 0.4 |

The above process has been practiced on over 150 samples of refined soybean oil and in each instance, except one, the treated samples of soybean oil had markedly improved odor stability at frying temperatures.

EXAMPLE 3

Step 1. Degassing and Gassing Treatment

In a 3-L. round-bottomed flask, fitted with a mechanical stirrer, thermometer, and gas delivery tube, 2000 grams of refined soybean oil are vigorously stirred for 45 minutes at reduced pressure (1.0 mm Hg). During this period of degassing, the temperature of the oil is slowly increased to 100° C. At reduced agitation, carbon dioxide gas is introduced into the flask until pressure slightly in excess of atmospheric is obtained.

Step 2. Catalyst Treatment

Stirring is halted and with a small, but continuous, flow of carbon dioxide gas into the flask 0.2% G–22 catalyst and 0.1% activated carbon are introduced into the flask. Stirring is increased to a moderate rate and a sufficient flow of carbon dioxide is maintained to prevent the incursion of air into the flask. The temperature of the oil is increased to 200° C. and reacted for 3 hours. The temperature of the oil is reduced to 60° C. and approximately 0.1% Dicalite (filter aid) is added. AFter mixing for several minutes, the mixture is filtered in a cloth-covered Buchner funnel under an atmosphere of nitrogen gas. The oil is recycled through the filter bed until clear. Thereafter the treated oil is degassed under vacuum and stored under a nitrogen gas atmosphere.

Step 3. Bleaching

The treated soybean oil is bleached in an atmosphere of nitrogen using 2.5% BC–200 bleaching clay at 120° C. for a period of 18 minutes. The temperature of the oil is reduced to approximately 75° C. and filtered using a Dicalite coated filter cloth. The oil is recycled through the filter until clear and brilliant.

Step 4. Deodorization

The treated and bleached soybean oil is deodorized for 1 hour by steam stripping at 225° C. at 2.0 mm Hg pressure. During the cooling cycle, at approximately 150° C., 33 ppm citric acid are added, and the oil maintained at this temperature with continued steam stripping for ten minutes. Cooling is resumed and at 130° C. the steam supply is closed and nitrogen gas is slowly admitted. The oil is packaged at approximately 40° C. by transfer into nitrogen gas-filled bottles.

EXAMPLE 4

Step 1 Degassing and Gassing Treatment

In a 3-L. round-bottom flask, fitted with a mechanical stirrer, thermometer, and gas delivery tube, 2000 grams of refined soybean oil are vigorously stirred for 45 minutes at reduced pressure (1.0 mm Hg). During this period of degassing, the temperature of the oil is slowly increased to 135° C. At reduced agitation, carbon dioxide gas is introduced into the flask until pressure slightly in excess of atmospheric is obtained.

Step 2. Catalyst Treatment

Stirring is halted and with a small, but continuous, flow of carbon dioxide gas into the flask, 0.1% G–22 catalyst and 0.15% activated carbon are introduced into the flask. Stirring is increased to a moderate rate and a sufficient flow of carbon dioxide is maintained to prevent the incursion of air into the flask. The temperature of the oil is increased to 300° C. and reacted for one-half hour. The temperature of the oil is then reduced rapidly to 70° C. and approximately 0.1% Dicalite (filter aid) is added. After mixing for several minutes, the mixture is filtered in a cloth-covered Buchner funnel under a nitrogen gas atmpshere. The oil is recycled through the filter bed until clear.

Step 3. Bleaching

The treated soybean oil is bleached in an atmosphere of carbon dioxide using 3% BC–200 bleaching clay at 110° C. for a period of 40 minutes. The temperature of the oil is reduced to approximately 60° C. and filtered using a Dicalite coated filter cloth. The oil is recycled through the filter until clear and brilliant.

Step 4. Deodorization

The treated and bleached soybean oil is deodorized for 1 hour by steam stripping at 250° C. at 3.5 mm Hg pressure. During the cooling cycle, at approximately 145° C., 35 ppm citric acid are added, and the oil maintained at this temperature with continued steam stripping for ten minutes. Cooling is resumed and at 125° C. the steam supply is closed and nitrogen gas is slowly admitted. The oil is packaged at approximately 40° C. by transfer into nitrogen gas-filled bottles.

EXAMPLE 5

Step 1. Degassing and Gassing Treatment

In a 5-L. round-bottomed flask, fitted with a mechanical stirrer, thermometer, and gas delivery tube, 3,500 grams of refined soybean oil are vigorously stirred for 90 minutes at reduced pressure (10 mm Hg). During this period of degassing, the temperature of the oil is slowly increased to 150° C. At reduced agitation, carbon dioxide gas is introduced into the flask until pressure slightly in excess of atmospheric is obtained.

Step 2. Catalyst Treatment

Stirring is halted and with a small, but continuous, flow of carbon dioxide gas into the flask, 0.01% G–22 catalyst and 0.01% activated carbon are introduced into the flask. Stirring is increased to a moderate rate and a sufficient flow of carbon dioxide is maintained to prevent the incursion of air into the flask. The temperature of the oil is increased to 260° C. and reacted for 12 hours. The temperature of the oil is reduced to 75° C. and approximately 0.7% Dicalite is added. After mixing for several minutes, the mixture is filtered in a cloth-covered Buchner funnel under an atmosphere of carbon dioxide. The oil is recycled through the filter bed until clear. Thereafter the treated oil is stored in a nitrogen gas atmosphere.

The treated soybean oil is bleached and deodorized according to the procedure described in Example 2.

EXAMPLE 6

Step 1. Degassing and Gassing Treatment

In a 3-L. round bottomed flask, fitted with a mechanical stirrer, thermometer, and gas delivery tube, 2,000 grams of refined soybean oil are vigorously stirred for 45 minutes at reduced pressure (10 mm Hg). During this period of degassing, the temperature of the oil is slowly increased to 130° C. At reduced agitation, carbon dioxide gas is introduced into the flask until pressure slightly in excess of atmospheric is obtained.

Step 2. Catalyst Treatment

Stirring is halted and with a small, but continuous, flow of carbon dioxide gas into the flask, .065% G-22 catalyst is introduced into the flask. Stirring is increased to a moderate rate and a sufficient flow of carbon dioxide is maintained to prevent the incursion of air into the flask. The temperature of the oil is increased to 230° C. and reacted for 90 minutes. The temperature of the oil is reduced to 65° C. and approximately 0.1% Dicalite is added. After mixing for several minutes, the mixture is filtered in a cloth-covered Buchner funnel under an atmosphere of carbon dioxide (or nitrogen). The oil is recycled through the filter bed until clear. Thereafter the treated oil is stored under a nitrogen gas atmosphere.

The treated soybean oil is bleached and deodorized according to the procedure described in Example 4.

EXAMPLE 7

In a pressure reaction vessel 1,200 lbs. of a partially hydrogenated soybean oil (iodine value 111) are degassed under a partial pressure of 2 millimeters of Hg with agitation while the oil temperature is raised from room temperature to 54° C. After 1 hour agitation is stopped, and no bubbling on the surface of the oil is observed. Carbon oxide gas is then bubbled through the oil with a small amount of the gas being vented in the head space above the oil. After one-half hour a positive pressure of one psi is obtained within the vessel; the introduction of $CO_2$ gas is stopped. A portion of the gassed oil (25 gallons) is withdrawn from the reaction vessel and mixed with 1 lb. (0.035%) of powdered Harshaw Cu-1106 P copper chromite catalyst (39% CuO, 43.5% $Cr_2O_3$, 10% BaO, apparent bulk density 30 lbs./ft.$^3$, surface area 50 m $^2$/g. and pore volume 0.76 cc/g.) and 2.4 lbs. (0.2%) of powdered activated carbon. The slurry is introduced into the remainder of the gassed oil. The oil slurry mixture is then heated to 250° C. and is agitated for 1 hour while maintained at the temperature of mixture at about 250° C. while sufficient $CO_2$ gas is introduced into the oil to maintain atmospheric pressure in the reaction vessel. The oil is then cooled to 130° C. and 9 lbs. of bleaching clay are added to the reacted oil. The mixture is agitated for 10 minutes and then filtered through a sparker filter and an additional 10 lbs. of bleaching clay are added to the filtered oil and the resulting mixture is degassed under a vacuum of 4-6 millimeters of mercury with agitation while maintained at a temperature of 130° C. After 1 hour the degassing is complete and the mixture is saturated nitrogen gas. The mixture is then filtered again through a sparker filter. The oil is then deodorized at 235° C. with steam under a vacuum of 4-6 millimeters of mercury for a period between 1 hour to 2 hours. After deodorization the oil is cooled to 50° C., the vacuum is broken with nitrogen gas, and the cooled oil is packaged.

Substantially the same results are allowed if the Harshaw Cu-1106P copper chromite catalyst is replaced with one of the following catalysts:

Girdler G-13 catalyst (45% CuO, 40% $CuCr_2O_4$, 15% $Cr_2O_3$ cubic, surface area 48 m$^2$/g., Hg pore volume 2.70 cc/g. at pore diameter range of 100-0.035 microns);

Harshaw Cu-0401 P catalyst (41% CuO, 44% $Cr_2O_3$, 11% BaO, apparent bulk density 54 lbs./ft.$^3$, surface area 14-15 m$^2$/g. and pore volume 0.47 cc/g.);

Harshaw Cu-1110 P catalyst (41% CuO, 46% $Cr_2O_3$, 9% BaO, apparent bulk density 41 lbs./ft.$^3$, surface area 40 m$^2$/g.and pore volume 0.92 cc/g.); and Harshaw Cu-0202 P catalyst (82% CuO, 17% $Cr_2O_3$, apparent bulk density 55 lbs./ft.$^3$, surface area 10-13 m$^2$/g, pore volume 0.55 cc/g).

EXAMPLE 8

In a 3-L. round bottomed flask, fitted with a mechanical stirrer, thermometer, and gas delivery tube, 2,000 grams of unhydrogenated refined soybean oil is bleached with 50 grams (2.5%) of BC-200 bleaching clay at about 115° C. for a period of 20 minutes under a nitrogen gas atmosphere. The temperature of the oil is reduced to about 70° C. and filtered using a Dicalite coated filter cloth. The oil is recycled through the filter until clear and brilliant.

The bleached refined soybean oil is deodorized for 1 hour by steam stripping at about 230° C. at 2.5 mm Hg pressure. During the cooling cycle, at approximately 155° C., 33 ppm citric acid are added, and the oil maintained at this temperature with continued steam stripping for 10 minutes. Cooling is resumed and at 130° C. the steam supply is closed and nitrogen gas is slowly admitted. The finished oil is packaged at approximately 45° C. by transfer into nitrogen gas-filled bottles.

EXAMPLE 9

The following five tables show the analytical analysis results of ten different samples of refined, unhydrogenated soybean oil taken from five different regions of the United States. Each sample was divided into three subsamples. Subsample 2 was treated to the process of Example 2, Subsample 3 was treated to the process of Example 8 and the remaining subsample was left untreated as a control. Column 1 shows the analysis of the refined unhydrogenated soybean oil feedstock of each sample. Column 2 shows the analysis of the finished treated oil which was prepared in accordance with the process of Example 2. Column 3 shows the analysis of the finished untreated oil which was prepared according to the process of Example 8.

The taste results of the finished treated oil samples were substantially the same, and it was virtually impossible to detect any differences in the different regional samples of the finished treated oil. Organoleptic tests showed that ambient temperature flavor, taste and odor of all the samples of finished treated oil and finished untreated oil had approximately equal flavor stability at ambient temperatures. When the oil samples (2 and 3) were heated to frying temperatures the finished untreated oil rapidly developed off odor whereas the finished treated oils remained substantially odor free.

The following tables demonstrate that the chemical analytical characteristics of the 10 different samples of finished treated soybean oil and finished untreated soybean oil are substantially the same.

TABLE 1

|   | First Sample | | | Second Sample | | |
|---|---|---|---|---|---|---|
|   | 1 | 2 | 3 | 1 | 2 | 3 |
| Analysis characteristics [1]: | | | | | | |
| a | 70/9.4 | 2/.2 | 4/.4 | 70/10 | 3/.3 | 8/.8 |
| b | 352 | 18 | 7 | 321 | 18 | 1.0 |
| c | 132 | 132 | 131.9 | 130.6 | 131.0 | 131.1 |
| d | 0.06 | 0.09 | 0.04 | 0.06 | 0.03 | 0.04 |
| e |  | 0.91 | 0.39 |  | 1.10 | 0.24 |
| f |  | 0.23 | 0.0 |  | 0.40 | 0.0 |
| g |  | 3,050 | 2,555 |  | 2,500 | 2,360 |
| h |  | 150 | 88 |  | 140 | 115 |
| i |  | 1,020 | 725 |  | 960 | 720 |
| j |  | 300 | 232 |  | 280 | 280 |
| k |  | 160 | 130 |  | 140 | 150 |
| l | 45.0 |  |  | 74.3 |  |  |
| m | 0.020 | 0.029 | 0.029 | 0.044 | 0.029 | 0.029 |
| n | 0.23 | 0.031 | 0.049 | 0.025 | 0.063 | 0.025 |
| o | 0.096 | 0.062 | 0.054 | 0.20 | 0.13 | 0.13 |

[1] See Legend following Table 5.

TABLE 2

|   | Third Sample | | | Fourth Sample | | |
|---|---|---|---|---|---|---|
|   | 1 | 2 | 3 | 1 | 2 | 3 |
| Analysis characteristics [1]: | | | | | | |
| a | 70/10 | 3/.3 | 3/.3 | 70/11.5 | 2/.2 | 3/.3 |
| b | 389 | 31 | 0.0 | 605 | 39 | 0.5 |
| c | 133.8 | 132.9 | 134.1 |  |  |  |
| d | 0.03 | 0.66 | 0.03 | 0.03 | 0.04 | 0.04 |
| e |  | 0.90 | 0.50 |  | 0.76 | 0.21 |
| f |  | 0.30 | 0.0 |  | 0.40 | 0.0 |
| g |  | 2,360 | 2,700 |  | 2,510 | 3,045 |
| h |  | 130 | 110 |  | 105 | 125 |
| i |  | 860 | 860 |  | 1,060 | 980 |
| j |  | 380 | 370 |  | 370 | 360 |
| k |  | 130 | 140 |  | 130 | 130 |
| l | 90.1 |  |  | 94.5 |  |  |
| m | 0.034 | 0.039 | 0.029 |  |  |  |
| n | 0.056 | 0.031 | 0.014 |  |  |  |
| o | 0.23 | 0.19 | 0.27 |  |  |  |

[1] See Legend following Table 5.

TABLE 3

|   | Fifth Sample | | | Sixth Sample | | |
|---|---|---|---|---|---|---|
|   | 1 | 2 | 3 | 1 | 2 | 3 |
| Analysis characteristics [1]: | | | | | | |
| a | 10/9.8 | 3/.3 | 6/.6 | 70/8.8 | 3/.3 | 4/.4 |
| b | 617 | 42 | 6 | 324 | 29 | 5 |
| c | 134.6 | 133.4 | 135.1 | 133.2 | 132.1 | 133.4 |
| d | 0.05 | 0.1 | 0.04 | 0.04 | 0.04 | 0.04 |
| e |  | 0.88 | 0.52 |  | 0.75 | 0.26 |
| f |  | 0.20 | 0.0 |  | 0.40 | 0.0 |
| g |  | 2,800 | 2,570 |  | 1,950 | 1,880 |
| h |  | 135 | 110 |  | 105 | 67 |
| i |  | 860 | 760 |  | 650 | 340 |
| j |  | 320 | 300 |  | 270 | 200 |
| k |  | 130 | 130 |  | 150 | 120 |
| l | 48.6 |  |  | 67.5 |  |  |
| m | 0.043 | 0.109 | 0.024 |  |  |  |
| n | 0.48 | 0.42 | 0.063 |  |  |  |
| o | 0.062 | 0.073 | 0.049 |  |  |  |

[1] See Legend following Table 5.

TABLE 4

|   | Seventh Sample | | | Eighth Sample | | |
|---|---|---|---|---|---|---|
|   | 1 | 2 | 3 | 1 | 2 | 3 |
| Analysis characteristics [1]: | | | | | | |
| a | 70/8.0 | 3/.3 | 3/.3 | 70/8.8 | 4/.4 | 5/.5 |
| b | 680 | 30 | 0.0 | 495 | 52 | 7 |
| c | 132.2 | 131.8 | 132.3 | 133.3 | 132.6 | 133.7 |
| d | 0.03 | 0.07 | 0.04 | 0.04 | 0.05 | 0.04 |
| e |  | 0.84 | 0.49 |  | 0.84 | 0.25 |
| f |  | 0.40 | 0.0 |  | 0.40 | 0.0 |
| g |  | 2,750 | 3,080 |  | 3,050 | 2,560 |
| h |  | 210 | 210 |  | 185 | 150 |
| i |  | 1,080 | 1,070 |  | 1,080 | 840 |
| j |  | 360 | 370 |  | 370 | 340 |
| k |  | 170 | 170 |  | 145 | 160 |
| l | 27.6 |  |  | 37.3 |  |  |
| m | 0.120 | 0.086 | 0.031 |  |  |  |
| n | 0.063 | 0.14 | 0.18 |  |  |  |
| o | 0.47 | 0.34 | 0.35 |  |  |  |

[1] See Legend following Table 5.

TABLE 5

|   | Ninth Sample | | | Tenth Sample | | |
|---|---|---|---|---|---|---|
|   | 1 | 2 | 3 | 1 | 2 | 3 |
| Analysis cyaracter8st8cs [1]: | | | | | | |
| a | 70/9.4 | 5/.5 | 6/.6 | 70/10 | 2/.2 | 3/.3 |
| b | 974 | 75. | 14 | 728 | 34 | 5 |
| c | 132.9 | 131.6 | 131.8 |  |  |  |
| d | 0.10 | 0.09 | 0.07 |  | 0.04 | 0.04 |
| e |  | 0.91 | 0.55 |  | 0.64 | 0.24 |
| f |  | 0.30 | 0.0 |  | 0.30 | 0.0 |
| g |  | 2,780 | 2,370 |  | 2,530 | 1,550 |
| h |  | 140 | 120 |  | 130 | 60 |
| i |  | 850 | 670 |  | 960 | 595 |
| j |  | 295 | 260 |  | 315 | 240 |
| k |  | 165 | 165 |  | 120 | 110 |
| l | 54.5 |  |  | 63.4 |  |  |
| m | 0.029 | 0.086 | 0.062 |  |  |  |
| n | 0.081 | 0.088 | 0.063 |  |  |  |
| o | 0.27 | 0.22 | 0.22 |  |  |  |

[1] See Legend on next page.

Legend:
a = Lovibond Color, Y/R.
b = Apparent Chlorophyll, μg./kg.
c = Iodine Value.
d = Free Fatty Acids, percent.
e = Dione, percent.
f = Dimer, percent.
g = Total Sterols, p.p.m.
h = Tocopherol α, p.p.m.
i = Tocopherol β, p.p.m.
j = Tocopherol γ, p.p.m.
k = Squalene, p.p.m.
l = Soap, p.p.m.
m = Cu, p.p.m.
n = Iron, p.p.m.
o = Chromium, p.p.m.

EXAMPLE 10

Six kilograms of unhydrogenated refined soybean oil were heated and agitated with 900 grams of finely powdered activated charcoal at a temperature of 108° C. for three hours under a nitrogen gas atmosphere. The oil was then cooled to 50° C., and filtered using diatomaceous earth as a filter aid to yield refined charcoal treated soybean oil (hereinafter referred to as URC oil). Two, one kilogram, samples of URC oil and unhydrogenated refined soybean oil were treated according to the process described in Example 2 employing different reaction temperatures for the catalyst treatment. Samples of URC oil, treated URC oil (herein TRC oil), and treated finished refined oil (herein TR oil) and treated finished refined oil (herein TR oil) were chemically analyzed and the results are shown in the following table:

| Oil sample | TR | TRC | TR | TRC | TR | URC |
|---|---|---|---|---|---|---|
| Reaction temp., °C | 230 | 235 | 240 | 245 | 250 | (Control) |
| Analysis characteristics: | | | | | | |
| a | 9/.3 | 5/.5 | 11/.3 | 5/.5 | 7/0.0 | 13/1.3 |
| b | 65 | 5 | 89 | 4 | 87 | 12 |
| c | .07 | .08 | .07 | .07 | .09 | .07 |
| d | 26.1 | 45.3 | 22.0 | 47.6 | 18.2 | 13.5 |
| e | .69 | .56 | .84 | .66 | .91 | .30 |
| f | 4.3 | 5.1 | 5.5 | 7.4 | 6.2 | 4.2 |
| g | .06 | .14 | .04 | .33 | .06 | .10 |
| h | .015 | .013 | .018 | .070 | .031 | .015 |
| i | .10 | .13 | .04 | .12 | .1 | .06 |

Legend:
a=Lovibond Color, Y/R.
b=Apparent Chlorophyll, μg./Kg.
c=Total Tocopherols.
d=Soap (p.p.m.) by Flame.
e=Diene, percent.
f=Trans isomer, percent.
g=Total P, p.p.m.
h=Total Cu, p.p.m.
i=Total Fe, p.p.m.

There appeared to be no significant difference between the oil that was charcoal-treated finished treated oil (TRC) and the noncharcoal-treated finished treated oil (TR). The only measurable difference between the TRC oil and TR oil was in the Lovibond Color and apparent chlorophyll. The TRC oil had less red pigmentation and substantially less total chlorophyll.

EXAMPLE 11

The following table shows the result of the analytical tests on refined soybean oil; catalyst treated soybean oil (treated in accordance with the procedure of Example 2); bleached, catalyst-treated soybean oil (treated in accordance with the procedure of Example 2); finished treated soybean oil (treated in accordance with the procedure of Example 2); finished untreated soybean oil (treated in accordance with the procedure of Example 8); and finished untreated, charcoal-treated oil (treated in accordance with the charcoal treatment procedure of Example 10 and the bleaching and deodorization procedures of Example 8).

TABLE

| | Refined soybean oil | Catalyst treated oil | Bleached treated oil | Finished treated oil | Finished untreated oil | Finished untreated charcoal treated oil |
|---|---|---|---|---|---|---|
| Analysis characteristics: | | | | | | |
| a | 70/8.3 | (¹) | 10/1.0 | 11/1.1 | 2/0.2 | 2/0.3 |
| b | 336 | 93 | 11 | 11 | 20 | 4 |
| c | 0.04 | 0.39 | 0.28 | 0.02 | 0.05 | 0.08 |
| d | 5.1 | 0.0 | 0.0 | 0.0 | 0.0 | 0.0 |
| e | 0.09 | 0.02 | 0.11 | 0.02 | 0.006 | 0.01 |
| f | 1.2 | 0.30 | 0.30 | 0.30 | 0.30 | 0.01 |
| g | 44.4 | 19.5 | 10.9 | 5.4 | 5.4 | 17.3 |
| h | 0.139 | 0.617 | 0.688 | 0.751 | 0.646 | 0.586 |
| i | 3.6 | 6.3 | 6.3 | 7.3 | 8.0 | 6.1 |
| j | 0.0 | 0.22 | 0.20 | 0.38 | 0.24 | 0.21 |
| k | 0.057 | .037 | 0.04 | 0.033 | 0.061 | 0.101 |
| l | 0.18 | 15.6 | 0.11 | 0.23 | 0.14 | 0.069 |
| m | 0.16 | 0.063 | 0.063 | 0.063 | 0.19 | 0.41 |
| n | 0.3 | 0.1 | (²) | (²) | (²) | 0.1 |
| o | 11.0 | 10.7 | 11.0 | 10.7 | 10.9 | 10.5 |
| p | 4.2 | 4.4 | 4.3 | 4.3 | 4.3 | 4.3 |
| q | 22.1 | 23.7 | 23.8 | 23.6 | 23.8 | 23.5 |
| r | 54.3 | 53.6 | 54.2 | 54.2 | 54.5 | 54.4 |
| s | 8.1 | 7.5 | 6.7 | 7.2 | 6.5 | 7.2 |

¹ Not read too green.
² Trace.

LEGEND:
a=Lovibond Color, Y/R.
b=Apparent Chlorophyll, μg./Kg.
c=Free Fatty Acids, percent.
d=Peroxide Value, mg./Kg.
e=Moisture, percent.
f=Total Phosphorous, p.p.m.
g=Soap, p.p.m.
h=Diene, percent conjugation.
i=Trans-isomers, percent.
j=Dimers, percent.
k=Total Tocopherols, percent.
l=Cu, p.p.m.
m=Fe, p.p.m.
n=Myristic Acid, percent by GLC.
o=Palmitic Acid, percent by GLC.
p=Stearic Acid, percent by GLC.
q=Oleic Acid, percent by GLC.
r=Linoleic Acid, percent by GLC.
s=Linolenic Acid, percent by GLC.

Organoleptic evaluation of each of the oil samples (URC, TRC and TR) showed that the samples had similar ambient temperature flavors and tastes. The TR oil catalytically treated at 250° C. possessed the best flavor stability at frying temperatures.

The finished treated soybean oil had excellent flavor stability at frying temperatures; whereas the finished untreated soybean oil and the finished untreated, charcoal-treated soybean oil had very poor flavor stability at frying temperatures.

EXAMPLE 12

An organleptic test was performed on a sample of finished untreated soybean oil (unhydrogenated refined oil as subject to conventional bleaching and deodorization) and a sample of the finished treated soybean oil of Example 2. A portion, 120 ml., of each oil sample was heated for 35 minutes in a closed room in an electric fry pan calibrated to 375° F. The odor in the room was checked at the following minute intervals: 1, 2, 3, 5, 7, 10, 15, 20, 25, 30, 35. The oils were timed from a cold start; the average temperature of the oil after 4 minutes was 360° F.

Odor tests of the finished untreated soybean oil; after (number of minutes);
- 0–2: the members of the testing panel were only faintly aware of a heating oil;
- 3: the members of the testing panel noticed a slight fish odor in the room and when they placed their faces directly over the pans, their eyes experienced a sharp, stinging sensation;
- 5: the members of the panel noticed a strong fish odor;
- 7–10: the members of the panel noticed a strong objectionable fish odor;
- 15–20: the members of the panel noticed a strong codfish odor;
- 25–30: the members of the panel stated that the odor in the room was still fish-like but not quite as intense as at the previous interval; and
- 35: the panel observed the same odor as at the previous interval and commented that a grassy odor was becoming prevalent.

Odor results of the finished treated soybean oil; after (number of minutes):
- 1–3: the panel observed no noticeable odor;
- 5: the panel noted a mild oil odor in the room;
- 7–20: the panel noticed a mild and warm oil odor which was not unpleasant;
- 25: the panel noticed a mild and slightly sweet odor; and
- 30–35: the panel noticed a mild and warm oil odor which was not unpleasant.

Thus, it has been demonstrated that the present process permits the preparation of finished refined soybean oil which can be used for frying without the development of an unpleasant strong fishy, grassy odor, which is characteristic of the presently available finished refined soybean oils on the market.

EXAMPLE 13

Finished treated oil prepared in accordance with the procedure of Example 2 was subject to a 14 months' storage in clear flint glass bottles packaged under nitrogen gas. The samples were subject to a broad temperature range between about 40°F. and about 100°F. The samples were divided into two groups and at the end of the 14 months one sample was exposed to 22,500 foot candle hours of light which approximately corresponds to the light exposure of vegetable oil packaged in flint glass bottles received in retail trade.

The samples were then tested by an experienced taste panel. The sampel scores were based on a rating scale going from 0 to 10 wherein 0 represents an unapproachably bad taste which probably no human would accept and 10 represents an unobtainable superior taste. Almost all fresh, finished refined soybean oils presently marketed score 6–7 on this scale. A freshly prepared sample of refined soybean oil (prepared in accordance with the method of Example 2 was used as the control in the group. The results of the storage test are shown below.

| | Mean Taste Rating (6 member testing panel) | |
|---|---|---|
| | Unexposed | Exposed |
| Sample 1 | 8.00 | 8.00 |
| Sample 2 | 7.67 | 8.67 |
| Sample 3 | 8.00 | 8.33 |
| Sample 4 | 8.00 | 7.67 |
| Sample 5 | 7.33 | 8.50 |
| Fresh Sample | 7.50 | 8.83 |

Thus the soybean oil produced by the present method possesses a superior taste compared to the presently marketed soybean oils and also possesses excellent taste storage stability.

Refined soybean oil is soybean oil that has been solvent-extracted from soybeans, solvent-stripped, treated with a caustic agent, such as sodium hydroxide, at elevated temperatures, water-washed, and vacuum-dried at elevated temperatures.

Partially hydrogenated refined soybean oil is refined soybean oil that has been hydrogenated to an extent wherein the iodine value of the oil is about 100, preferably at least 105.

Finished untreated soybean oil is unhydrogenated or partially hydrogenated refined soybean oil that has been bleached and deodorized by conventional means.

Finished treated soybean oil is unhydrogenated or partially hydrogenated refined soybean oil that has been catalyst treated, bleached and deodorized as described in this specification.

I claim:

1. A method of improving the flavor stability at frying temperature of an unhydrogenated or partially hydrogenated refined soybean oil which comprises the steps of :
   degassing refined, unhydrogenated or partially hydrogenated soybean oil under vacuum conditions to remove a substantial portion of the atmospheric gases contained therein;
   saturating the degassed oil with carbon dioxide gas, adding a predetermined amount of copper chromite to the carbon dioxide saturated oil to form a mixture, heating the mixture at a temperature of 100° to 310°C for a predetermined length of time;
   cooling the mixture to a temperature below 75°C;
   filtering the cooled mixture to remove solids therefrom; and
   deodorizing the filtered oil with steam under vacuum conditions to provide a soybean oil having an Iodine Value of at least 105 that is substantially absent objectionable flavor when heated to a frying temperature of 350°–400°F.

2. The process according to claim 1 wherein the mixture contains about 0.01% to about 0.2% by weight of copper chromite.

3. The process according to claim 1 wherein the mixture is heated for a period of at least one-half hour.

4. The process according to claim 1 wherein the copper chromite contains by weight from about 7% to about 65% nonelemental copper and from about 4% to about 41% by weight nonelemental chromium.

5. The process according to claim 4 wherein the copper chromite includes by weight from about 4% to about 14% nonelemental barium.

6. The process according to claim 4 wherein the copper chromite includes by weight from about 2% to about 6% zirconium.

7. The process according to claim 1 wherein the mixture further contains a predetermined amount of activated charcoal.

8. The process according to claim 7 wherein the mixture contains about 0.01% to about 0.2% by weight of activated charcoal.

9. The process according to claim 1 including the additional steps of:
   degassing the filtered oil to remove a substantial portion of the carbon dioxide gas contained therein; and
   gassing the degassed oil with nitrogen gas before deodorization.

10. In a method of improving the flavor stability at frying temperature of unhydrogenated and partially hydrogenated refined soybean oil which comprises the steps of:
    degassing refined, unhydrogenated or partially hydrogenated soybean oil under vacuum conditions to remove a substantial portion of the atmospheric gases from the oil; and
    saturating the soybean oil with carbon dioxide gas, adding a predetermined amount of copper chromite and finely powdered activated charcoal to the oil to form a mixture, and heating the mixture in a carbon dioxide gas atmosphere at a temperature from about 90°C to about 300°C for a period of at least one-half hour.

11. The process according to claim 10 wherein the copper chromite contains by weight about 7% to about 65% nonelemental copper and about 4% to about 41% nonelemental chromium.

12. The process according to claim 11 wherein a copper chromite includes about 4% to about 14% nonelemental barium.

13. The process according to claim 10 wherein the copper chromite is powdered Girdler brand copper chromite catalyst G-22.

14. The process according to claim 13 wherein the mixture is heated to a temperature of about 250°C during the heating step.

15. The process according to claim 10 including the additional steps of:
    cooling the heated oil mixture to a temperature below 75° C. after the heating step;
    filtering the cooled oil mixture to remove the solids therefrom;
    degassing the filtered oil under vacuum conditions to remove a substantial portion of the carbon dioxide gas therefrom; and
    gassing the degassed oil with nitrogen gas.

16. The process according to claim 15 including the additional steps of:
    bleaching the treated oil with bleaching clay at an elevated temperature in a nitrogen gas atmosphere after gassing the degassed oil with nitrogen gas; and
    deodorizing the bleached oil with steam under vacuum conditions.

17. The process according to claim 10 wherein the mixture contains about 0.065% to about 0.1%, by weight, of the copper chromite and with about 0.065% to about 0.1% by weight, of the charcoal.

18. The process according to claim 17 wherein the mixture is heated to a temperature of about 250°C for about 1 hour.

19. In a method of improving the stability of unhydrogenated and partially hydrogenated refined soybean oil for frying purposes which comprises:
    heating carbon dioxide saturated unhydrogenated or partially hydrogenated refined soybean oil with, by weight, about 0.065% to about 0.1% of a copper chromite and about 0.065% to about 0.1% of a finely powdered activated charcoal in a carbon dioxide gas atmosphere at a temperature of about 250° C. for about 1 hour, said soybean oil being substantially free of atmospheric gases.

* * * * *